Sept. 30, 1958　　H. W. WILSON　　2,854,351
METHOD OF APPLYING DRESSING FOR PROLONGING
THE EFFECTIVE LIFE OF CLOTH BELTS AND
RESULTANT ARTICLE
Filed June 9, 1953
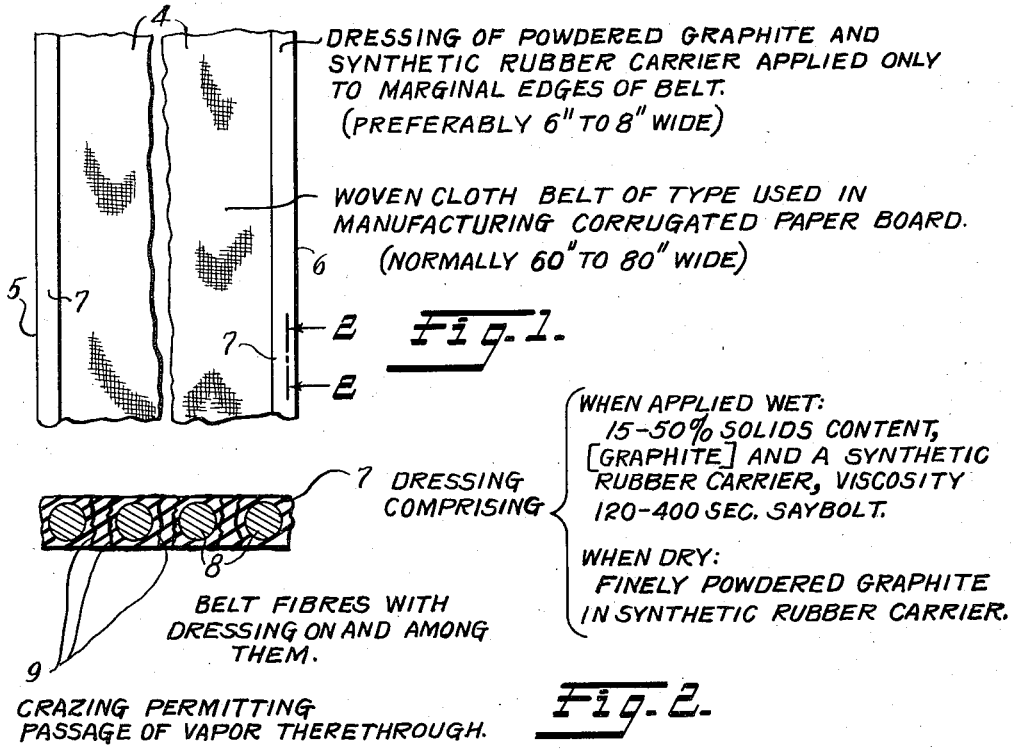

2,854,351

METHOD OF APPLYING DRESSING FOR PROLONGING THE EFFECTIVE LIFE OF CLOTH BELTS AND RESULTANT ARTICLE

Harry Walter Wilson, Millbrae, Calif.

Application June 9, 1953, Serial No. 360,590

7 Claims. (Cl. 117—44)

This invention relates to improvements in industrial cloth belts, of the types used on machines for manufacturing corrugated paperboard and the like. Particularly, it relates to a dressing for prolonging the effective life of such belts. It also relates to a method of treating such belts so as to prolong their life and increase their efficiency.

In manufacturing corrugated paperboard, large cloth belts, usually woven from cotton, are used to carry the paperboard over heated cast iron or steel platens to dry the glue which secures the corrugated paper to the smooth outer surface or surfaces. These belts are expensive, and they are vital in the production of corrugated board. Heretofore, several factors had required that these belts be replaced in toto when only the outer six to twelve inches on each edge of the belt were actually worn; i. e., the belt would still be in excellent condition across its entire width except for the aforementioned edges, but because of the problems these worn edges produced, the entire belt had to be discarded.

Such effective belt life has varied from one location to another, dependent on the severity of over-all conditions encountered, but, generally speaking, problems started to show up after approximately 30 million lineal feet, and became increasingly severe until the belt was finally discarded at approximately 45 million to 50 million lineal feet.

When the belt edges became severely worn or unraveled, loss in belt thickness at the edges resulted. This lack of pressure at the edges relative to the entire width of the belt permitted the active steam that was present to wash out or dilute the glue along the edges of the corrugated board and prevented these edges from being properly bonded. Often, a belt so worn at the edges was still so new that the management was reluctant to replace it, and where that was the case, the usual result was a drop in quality and quantity of production.

Attempts have been made to prolong the life of the belts by turning them over periodically. This was expensive; if done often enough (and it was usually done during the time-and-a-half and double-time periods of the week), the cost in terms of wages soon mounted to a substantial figure and sometimes even exceeded the cost of a brand new belt; so this approach was not a satisfactory solution to the problem.

Moreover, no matter how often a belt is turned, the unprotected edges continued to be baked and therefore got brittle. Adhesive that transferred onto the belt and dried could not be scraped off without scoring and gouging the belt deeply at these brittle, weakened edges. Where the belts had to be raised manually, rips and tears along these baked edges were the rule rather than the exception.

Another problem that has shortened the effective life of the belts was that of lubricating grease for the machinery transferring to the belt at various points along the machine. Then the corrosive action of the hot grease quickly ate away the fibres of the belt.

Another problem, perhaps the most important, was the friction wear caused by the fact that the edges of the belt scrape along the metal plates. The amount of friction wear on the belt may be more easily appreciated by a quick breakdown of some common figures. On the basis of a production of 10 million lineal feet per month, a 170-foot belt makes about 705,000 revolutions per year. Taking the average length of the hot-plate section as 40 feet, this means that the belt edges are scuffed across 28,000,000 feet of cast iron each year. Under such conditions, it is a tribute to the toughness built into these belts that they last as long as they do, because a vegetable fibre such as cotton was never intended by nature to hold its own against metal in a contest of attrition.

How this scuffing action affected production and quality is best illustrated by examining what is happening at the glue line:

In order for the adhesive to set, a certain percentage of moisture has to be evaporated (in the case of silicate); or has to be chemically bound as well as evaporated (in the case of starch). The heat of the machine vaporizes the moisture of the paperboard as well as of the adhesive as it travels along, with the concentration of heat being greatest at the center of the machine. At that point, therefore, free moisture is vaporized quickest and most completely. Some vapor passes up through the top liner of the corrugated board and then passes through the belt fibers to atmosphere. But the board and the belt are both relatively good insulators, and, in the few seconds allowed, they are not able to pass off anywhere near the amount of vapor that is created.

The excess vapor, in the form of an expanding gas, naturally flows through the flutes provided by the corrugated paper and rushes to escape from the open ends, at the edges of the belt. At that point, the vapor is under propulsion; it is not a sluggish-moving mass, but is a rapidly moving jet. So long as the belt edges remain the same thickness as the middle of the belt, rider rolls hold the belt edges in close contact with the board edges, and the contact between the flute tips and the bottom liner is tight enough to resist the eroding action of the vapor. Therefore, the edges of the board will be stuck together almost as well as the center, except possibly for the last inch.

But when the belt edges have worn away, their thickness was reduced, and the edges of the rider rolls rotated in the air instead of against the belt, and so did not furnish the pressure necessary to counteract the attack of the vapor jets. The result was that the vapor was not confined to the channels provided by the flutes, but expanded and squirted between the flute tips and liner, washing the adhesive entirely away at those points. Instead of there being no more than one inch where the edge was stuck together rather poorly, there was up to four inches of edges not stuck at all. In order to run the machine under such circumstances, speeds had to be reduced considerably. If there were wet-edged rolls in the plant, or if schedules called for a heavy percentage of boards of such thicknesses as .021" and .030", the speeds had to be reduced still further.

In order to solve all these problems, much study and research has gone into the preparation of belt dressings, but no satisfactory dressing had heretofore been developed. There are severe basic requirements: the dressing must not become brittle but must maintain its flexibility under both heat and cold; it must be impervious to the heat-attack of the hot plates; it must not become sticky; it must preserve the toughness and flexibility of the cotton belt fibres underneath it; it must provide as near a friction-free ride along the cast iron bed of its travel as can be obtained; it must resist adhesive compaction;

and it must resist the highly corrosive effects of oil and grease drippings.

Other objects and advantages of the invention will appear from the following description, reference being made to the accompanying drawing, in which:

Fig. 1 is a top plan diagrammatic view of a portion of a dressed belt for use in machines for manufacturing corrugated paper board and embodying the principles of the present invention, the belt being broken, both longitudinally and transversely, to conserve space;

Fig. 2 is a diagrammatic cross-sectional view, much enlarged, of a dressed portion of the belt of Fig. 1 taken approximately on the line 2—2 in Fig. 1; and Fig. 3 is a flow diagram illustrating a process of dressing belting in accordance with the present invention.

Basically (see Fig. 1), my improvement in cloth belts 4 comprises dressing their edges 5 and 6 with a lubricant 7 which is part of and is adhered by means of a suitable adhesive vehicle. More specifically, my new dressing 7 comprises graphite borne by an adherent base of a suitable synthetic rubber elastomer having the proper viscosity in relation to proper solids. This dressing 7 penetrates in between the belt fibers 8 and also adheres to them, providing a lubricant surface on the marginal edges 5 and 6 of the belt 4. A novel and unexpected result of this combination is that, as the graphite lubricant gradually wears off, new graphite surfaces are continually being exposed.

Graphite by itself is not suitable for application to belts. It would discolor the board so as to render it unsalable. Economically, it would wear off so rapidly and require renewal so often that the cost would be prohibitive. The base material of my dressing, a synthetic rubber latex, is unsatisfactory when used by itself, for it has no lubricant qualities. Even a direct mixture of graphite and the base is unsuitable, until adjusted to the proper viscosity. However, by incorporating the graphite into a suitable vehicle or base whose viscosity lies within a particular range, surprising results are achieved: the combination will do what neither the graphite alone nor the vehicle alone could do. The result is a long lasting dressing which never becomes brittle, which maintains its flexibility under both heat and cold, is substantially impervious to the heat attack of the hot plates, does not become sticky, preserves the toughness and flexibility of the cotton belt fibres, provides a lubricated, relatively friction-free ride for the belt, resists adhesive compaction, and resists the highly corrosive effects of oil and grease drippings.

The graphite used in the dressing should be very finely powdered graphite, a micrographite such as Dixon's #635 or equivalent. This material lends itself to complete dispersion on and among the belt fibres to give the desired lubricant qualities.

A suitable vehicle or base material may be prepared from certain classes of synthetic rubber latex or from ready-prepared proprietory products incorporating such latices suitably modified and formulated. Natural rubber latex is unsuitable, and so are some synthetic latices, such as the polyvinyl compounds, which crack too badly. Suitable synthetic latices include: butadiene-styrene copolymers such as Buna S, butadiene-acrylonitrile copolymers such as Buna N, isobutylene-butadiene copolymers such as Butyl, polychloroprene such as neoprene, and for some uses a polyaklylene polysulfide such as Thiokol. For all-around purposes, Buna S is preferred with Butyl and Buna N latexes also good, but when greater-than-ordinary resistance to oil and greases is necessary then Thiokol or neoprene would be preferable. Of the Buna S type rubbers, GR-S type 3 has given excellent results.

The latex should be modified by the usual accelerators, stabilizers, and buffers. In fact, the ready-prepared latices already containing the accelerators, stabilizers, and buffers can be purchased and used, if modified as shown later. For example, a suitable base may be made as follows:

| | |
|---|---|
| GR-S (a Buna S rubber latex) | 50 lbs. dry solids basis. |
| 10% KOH solution | 0.4 lbs. |
| Formaldehyde | 3.0 lbs. |
| Methylamine | 0.3 lbs. |
| Zinc oxide | 2.0 lbs. |
| Butyl zimate | 0.5 lbs. |
| Dispersing agent | Amount needed to obtain proper dispersion. |

In this preparation, the potassium hydroxide acts to buffer the acidity of the formaldehyde; the zinc oxide acts as a vulcanizing agent; the butyl zimate acts as an accelerator, and the methylamine as an anti-oxidant. In addition to the zinc oxide, sulfur could be added. Properly prepared proprietory pastes may be substituted in whole or in part for the individual chemical ingredients herein. For example, such anti-oxidants as Flectol H and Neozone D could be used, and the accelerators could be Setsit #5 or Tepidone.

The zinc oxide, butyl zimate, and methylamine are preferably ballmilled as a heavy paste, using sodium caseinate or some similar substance as a dispersing agent. Meanwhile, the latex may be placed in a suitable kettle and given proper agitation, the buffer solution mixed in well, and the formaldehyde added and mixed. Finally, the ballmilled paste is added and mixed in until complete dispersion is obtained. The resultant product can be stored for use in subsequent operations or can be processed immediately with the other elements, as described below.

The base, whether prepared substantially as above or purchased on the market under the various trade names, must, in order to act as a suitable vehicle in the dressing, be adjusted for viscosity and solids content.

If the viscosity is too low (too thin), the solids will be carried too far into the interstices of the belt weave and the high surfaces will be starved. Lubrication will not be obtained and a substantial amount of the cloth fibres will be destroyed before any graphite is encountered.

If the viscosity is too high (too thick), the dressing will merely coat the top surfaces of the woven belt. This coating will trap a large proportion of the vapor and heat which should pass out from the board through the belt. One of the main purposes of a cotton belt is to conduct the passage of the steam and heat to the atmosphere while the glue is being dried, and if the steam cannot pass through, a wet condition will be created. Also, if the viscosity is too thick, the film will tend to cling to the pulleys and other points of friction and will be rolled off, carrying with it all the lubricant and exposing the bare fibres of the cloth, as well as fouling up the equipment.

When the dressing is compounded properly, upon application to the belt its water will begin to disperse instantaneously into the belt fibres. It will carry with it a certain percentage of the solids, and these will be imbedded in and around the fibres to form an anchor for the graphite. Surfaces as well as interstices will be thoroughly coated in this manner, and the graphite will be found to be dispersed and bound in microscopic fashion throughout the coating. It is these microscopic flakes which friction wear continuously exposes, and cumulatively they provide a continuous lubricious film, and yet are so evenly dispersed and tightly anchored that they cannot rub off to discolor the plates or board. To obtain this effect the base solution which has been described must be diluted or initially compounded, so that the adhesive solids will preferably run about 30% to 33% and so that the viscosity at that solids ratio will run 160 to 176 seconds Saybolt. This is not meant to limit the dressing to these preferred ranges; it is expressed only as the range within which optimum results may be obtained. The dressing can be used with varying degrees of efficiency anywhere between about 15% and about 50% solids at viscosities ranging from about 120 seconds to about 400 seconds Saybolt. When the dressing dries, it will therefore be comprised of the graphite and the synthetic elastomer forming the base of the latex.

The best way of applying the graphite is to make a paste with part of the water that will be needed to achieve the desired viscosity in the final dressing, this viscosity having been predetermined so as to lie within the desired range and at whatever value within this range seems desirable. In other words, some of the water may be added directly to the prepared base and some of the water may be first mixed with the graphite. After the graphite has been dispersed in this water to form a paste, it is added to the prepared base and the remaining water and mixed under high speed agitation. The graphite is ideally added in the proportion of 28 ounces per five gallons of diluted base but may lie within the range of approximately 15 to 50 ounces per five gallons of diluted base or between 2% and 8% by weight, with varying degrees of protection and discoloration. Thus when the water has evaporated, the graphite will be present in the amount of 2 to 8 parts per 15 to 50 parts of elastomer, or about 3.8% to about 34.8%, or, speaking roughly about 5% to 40% of the total, the elastomer comprising the remaining 95% to 60%. For example, when a prepared base is used that consists of 50% solids, the following recipe will show how the dressing may be prepared:

100 lbs. of prepared base (50% solids)
33 lbs. of water
5 lbs. 4 ounces of graphite The resultant dressing is applied only along the marginal edges of the belt, for two reasons. First, because the problems of baking, scuffing and rapid fraying occur only at the edges, which are the only portions that rub against the hot steel or cast iron platens. Second, because it is undesirable to have any coating across the entire width of the belt, as that might interefre with the "breathing," or passage of steam vapor, through the belt.

The dressing is most efficiently applied when the belt is relatively cool, i. e., under about 160° F. It is most efficiently applied by brush along a strip approximately 6 to 8 inches wide on each edge. (The normal width of corrugating belts is about 60 to 80 inches; the strip may be somewhat wider or narrower depending on the narrowest width of board that a given manufacturer normally will process.) On the first application to an untreated belt, two to three coats are brushed on without allowing any time for drying in between the successive coats. In other words, the dressing is brushed on for the full length of the belt, moving it around section by section until the starting point is reached. The second coat is then applied immediately in the same fashion; and finally, if found necessary, the third coat is applied as soon as the starting point has come around the second time.

After treatment, the belt is permitted to air-dry for about 24 hours at surrounding air temperatures. This insures that there will be no transfer of the wet dressing to the hot platens before the coating has had a chance to be cured thoroughly. After this period of air-drying, the machine is put into production. Normal heats on these machines range between 325° F. and 375° F., and this heat will be ample to vulcanize the belt dressing to its permanent form within an hour or two. This vulcanization permanently binds the dressing to the cotton fibres, and the dressing in turn binds the particles of graphite to itself as well as to the fibres of the belt. In the specific example given, the dried and cured composition will therefore be approximately 10% graphite and 90% elastomer (more exactly, 9.5% graphite and 90.5% elastomer), using the proportions given in the specific formula above.

With the dressing dried and cured, it then comprises an intimate cured mixture of about 5% to 40% by weight of graphite and about 95% to 60% by weight of elastomer from the group above described. This dressing impregnates and covers the marginal side edges only of the belt.

These belts 4 flex continually as they pass over large and small diameter pulleys, and this flexing is sufficient to craze the originally impervious film enough to allow sufficient vapor to escape through the coating to avoid a wet condition. Since the cracks 9 are microscopic, they do not affect the binding of the graphite dressing 7 to the fibres 8 of the belt 4. As a result, the dressed belt rides along over the cast iron bed against which the edges of the belt rub, and, instead of wearing, the fibres are lubricated by the graphite particles and thus protected against scuff. (The coating itself protects against embrittlement of the fibres by the baking action of the hot platens.) As the coating gradually wears down, more particles of graphite are exposed so that there is always a lubricant between the belt fibres and the metal; and also a buffering film between the belt fibres and such destructive agents as grease and compacted adhesive. When, finally, the belt dressing does wear off to the point where the surface fibres begin to show, a new application may be made without having to remove the belt from the machine.

The initial application of this dressing will cost, in material and labor, about $75.00. Subsequent touch-up applications will cost about $20.00 per application. Experience indicates that 5 such applications may be necessary in order to double the effective life of the belt. This represents a total cost of $175.00. This compares with the cost of about $3,500.00 to $3,800.00 for a new belt. In addition, it is simpler to apply dressing than to install a new belt. Finally, the belt operates better, so that the corrugated board is glued better at the edges than when an undressed belt is used, thus gaining quality as well as increased quantity, both of which are dollars-and-cents factors to the manufacturer.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. An industrial belt for use in machines for manufacturing corrugated paper board, including a heavy woven cloth belt having its marginal side edges only impregnated with and covered by an intimate cured mixture of about 5% to 40% graphite by weight and about 95% to 60% elastomer by weight, said elastomer being chosen from the group consisting of butadiene-styrene copolymers, butadiene-acrylonitrile copolymers, isobutylene-butadiene copolymers, polychloroprene, and polyalkylene polysulfides.

2. An industrial belt for use in machines for manufacturing corrugated paper board, including a heavy woven cloth belt having its marginal side edges only impregnated with and covered by an intimate cured mixture of about 10% by weight graphite and about 90% by weight butadiene-styrene copolymer.

3. An industrial belt for use in machines for manufacturing corrugated paper board, including a heavy woven cloth belt having its marginal side edges only impregnated with and covered by an intimate vulcanized mixture of about 10% graphite and about 90% synthetic rubber, said synthetic rubber being chosen from the group consisting of butadiene-styrene copolymers, butadiene-acrylonitrile copolymers, isobutylene-butadiene copolymers, polychloroprene, and polyalkylene polysulfides.

4. A method for protecting the side edges of a cloth belt by a dressing, comprising applying to the marginal side edges only of said belt at a temperature below approximately 160° F. a mixture of unvulcanized synthetic rubber latex and graphite in the proportions by weight of about 2% to 8% graphite, about 15%–50% latex solids, and about 83% to 44% water, said mixture being adjusted to a viscosity between 120 and 400 seconds Saybolt; air drying said dressing for about 24 hours, and then vulcanizing the dressing during actual operation between about 325° and 375° F.

5. A method for protecting the side edges of a cloth belt by a lubricating coating, comprising brushing on said side edges only at a temperature below 160° F. an intimate mixture of unvulcanized synthetic rubber latex, graphite, and water in the proportions by weight of about 2% to 8% graphite, about 15%–50% latex solids, and about 83% to 44% water, said mixture being adjusted to a viscosity between 120 and 400 seconds Saybolt; air-drying said mixture for about 24 hours, and then vulcanizing said latex during actual operation at between about 325° and 375° F.

6. A method for protecting the side edges of a cloth belt by a lubricating coating, comprising brushing on said side edges only at a temperature below about 160° F. an intimate mixture of unvulcanized synthetic rubber latex, graphite, and water in the proportions by weight of about 2% to 8% graphite, about 15%–50% latex solids, and about 83% to 44% water, said mixture being adjusted to a viscosity between about 160 and about 176 seconds Saybolt; air-drying said mixture for about 24 hours, and then vulcanizing said rubber during actual operation at between about 325° and 375° F.

7. A method for protecting the side edges of a cloth belt by a lubricating coating, comprising: applying to the marginal side edges only, a thin paste of unvulcanized synthetic elastomer, water, and graphite in the proportions by weight of about 2% to 8% graphite, about 15% to 50% elastomeric solids, and about 83% to 44% water, the viscosity of said paste being adjusted to lie between 120 and 400 seconds Saybolt; air-drying the applied paste; and then vulcanizing it under actual operating conditions.

References Cited in the file of this patent

UNITED STATES PATENTS

| | | | |
|---|---|---|---|
| 862,403 | Lahue | Aug. 6, | 1907 |
| 1,356,890 | Smith | Oct. 26, | 1920 |
| 1,870,408 | Dreyfus | Aug. 9, | 1932 |
| 2,001,582 | Parker | May 14, | 1935 |
| 2,181,835 | Place | Nov. 28, | 1939 |
| 2,287,780 | Carman | June 30, | 1942 |
| 2,441,090 | TeGrotenhuis | May 4, | 1948 |
| 2,558,929 | Bunish | July 3, | 1951 |
| 2,626,941 | Habeck | Jan. 27, | 1953 |
| 2,640,366 | Knuth | June 2, | 1953 |
| 2,655,195 | Curtis | Oct. 13, | 1953 |
| 2,700,623 | Hall | Jan. 25, | 1955 |